United States Patent Office 2,763,633
Patented Sept. 18, 1956

2,763,633

SUBSTANTIALLY NON-CAKING COMPOSITIONS CONTAINING A NORMALLY COALESCENT COPOLYMER OF VINYL ACETATE AND AN ETHYLENICALLY UNSATURATED ORGANIC CARBOXYLIC COMPOUND HAVING AT LEAST ONE CARBOXYL GROUP

Howard A. Gray, Nahant, Mass., assignor to Monsanto Chemical Company, St. Louis, Mo., a corporation of Delaware No Drawing. Application February 8, 1952,
Serial No. 270,739

12 Claims. (Cl. 260—78.5)

The present invention relates to compositions comprising coalescent copolymers of vinyl acetate and unsaturated organic carboxylic compounds having at least one carboxyl group, and it more particularly relates to dry substantially non-caking mixtures containing particles of such copolymers. The present invention also relates to processes of preparing such compositions and mixtures.

The preparation of particles of copolymers of vinyl acetate and certain unsaturated acids such as crotonic acid by emulsion polymerization has been suggested heretofore in the art. Certain of these copolymers which contain a substantial amount of vinyl acetate coalesce or sinter at room temperature, that is, they possess cold-flow properties at temperatures between about 70 and 100° F. These copolymers are water-insoluble, but are dispersible or soluble in aqueous solutions of caustic soda. Due to the coalescing or sintering properties of these copolymers at room or storage temperature they cannot be stored or shipped in the form of beads or particles because the beads or particles coalesce or cake to form a larger mass or agglomerate which is very difficult to dissolve or disperse at the point of use. Moreover, particles of the alkali salts of such copolymers also coalesce or sinter at room temperatures or storage temperatures and present the same problems in this respect as the copolymers per se. Various additives have been tried to prevent the caking or coalescence of such copolymers, for example, additives such as calcium stearate, but heretofore the successful non-caking agents have been detrimental to the end use of such copolymers, particularly in textile finishing and sizing. Attempts have been made to avoid these problems by dispersing or dissolving the copolymer beads or particles in an aqueous solution of caustic soda, and then storing and shipping the resulting dispersion or solution. However, this expedient increases the cost of preparing, storing and shipping the product. Moreover, the dispersions or solutions thus prepared are alkaline and this alkalinity causes hydrolysis of the copolymer in storage with a consequent reduction in pH of the solution due to the formation of acetic acid during hydrolysis. After a while the pH decreases to the point where the copolymer is precipitated from the dispersion solution in its modified form. Consequently this procedure is not entirely satisfactory.

It is one object of this invention to provide a stable, substantially dry mixture comprising beads or particles of water-insoluble coalescent copolymers of vinyl acetate and unsaturated organic carboxylic compounds having at least one carboxyl group, which mixture is substantially non-caking and contains an agent which aids or promotes the dispersion or dissolution of the copolymers in water without interfering with the end use of the copolymers.

It is a further object of this invention to provide a process for producing a stable, substantially dry, non-caking mixture containing beads or particles of coalescent, water-insoluble copolymers of vinyl acetate and an unsaturated organic carboxylic compound having at least one hydroxyl group.

Still further objects and advantages of this invention will be apparent from the following description and the appended claims.

These and other objects of this invention are attained, in general, by providing an intimate dry mixture of substantially dry beads or particles of a coalescent, water-insoluble, alkali-dispersible copolymer of vinyl acetate and an unsaturated organic carboxylic compound containing from 3 to 9 carbon atoms and having at least one carboxyl group as, for example, crotonic acid or a lower alkyl half ester of maleic acid, and an amount of a substantially dry, alkaline metal inorganic compound in particle form sufficient to substantially prevent caking or agglomeration of the beads or particles of the copolymer. It is preferred to provide a mixture which contains an amount of the alkali metal compound sufficient to substantially prevent caking or agglomeration of the particles of copolymer and also sufficient to disperse or dissolve the copolymer when the mixture is added to water and stirred.

The term "coalescent, water-insoluble, alkali dispersible copolymer" as used above and in the following description and appended claims is intended to mean a copolymer the particles of which coalesce or agglomerate at temperatures between 70 and 120° F. and are not soluble or dispersible in water per se, but are soluble or dispersible in an aqueous solution of caustic soda at a pH above 7 in concentrations of at least 2% by weight.

The term "substantially dry, alkaline alkali metal inorganic compound" as used above and in the following description and appended claims is intended to mean a compound which contains insufficient water to cause caking or coalescing of the copolymer particles, and which is soluble in water to give a water solution having an alkaline reaction, that is, a water solution having a pH above 7.0. Such term includes such alkaline alkali metal salts as anhydrous sodium carbonate, sodium bicarbonate, trisodium phosphate, sodium borate, the corresponding potassium, lithium and cesium compounds and the like, but excludes the alkali metal hydroxides and other alkaline alkali metal inorganic compounds which are not suitable because they do not prevent caking of the copolymer particles. Of the foregoing compounds, anhydrous sodium carbonate and sodium bicarbonate are preferred because they provide superior non-caking mixtures and also provide sufficient basicity or alkalinity to cause dissolution or dispersion of the copolymer when the mixture is added to water with stirring. Sodium bicarbonate is preferred over sodium carbonate since sodium bicarbonate provides superior solutions when the mixture thereof with the copolymer is dissolved in water.

The copolymers employed in the mixtures of this invention may be prepared from vinyl acetate and a large variety of unsaturated organic carboxylic compounds containing from 3 to 9 carbon atoms and having at least one carboxyl group and which are polymerizable with vinyl acetate. As examples of such carboxylic compounds may be mentioned the unsaturated organic monocarboxylic acids such as alkenic mono-carboxylic acids having from 3 to 6 carbon atoms, as, for example, acrylic acid, butenic acids such as crotonic acid and isocrotonic acid, methacrylic acid and vinylacetic acid and pentenic acids such as tiglic and angelic acids. In general, the unsaturated aliphatic mono-carboxylic acids of the general formula, $C_nH_{2n-2}O_2$, where $n$ is a whole number from 3 to 6, and which are polymerizable with vinyl acetate, are useful in preparing the copolymers employed in the mixtures of this invention. Of the above group of acids crotonic acid is preferred because it is available commercially and copolymerizes with vinyl acetate to give superior copolymers.

As further examples of unsaturated organic carboxylic compounds may be mentioned the water-insoluble unsaturated organic polybasic carboxylic acids which are polymerizable with vinyl acetate as, for example, the water-insoluble ethylenically unsaturated aliphatic dicarboxylic acids which are polymerizable with vinyl acetate such as fumaric acid and itaconic acid. Of the above acids fumaric acid is preferred because it is available commercially.

As further examples of unsaturated organic carboxylic compounds which may be used with vinyl acetate to form copolymers useful in the mixtures of this invention may be mentioned the partial esters of ethylenically unsaturated aliphatic dicarboxylic acids polymerizable with vinyl acetate, and preferably the alkyl half esters of such acids as, for example, the alkyl half esters of maleic acid in which the alkyl group contains from 1 to 4 carbon atoms, such as methyl, ethyl and propyl acid maleates; the alkyl half esters of fumaric acid in which the alkyl group contains from 1 to 4 carbon atoms, such as methyl acid fumarate and butyl acid fumarate; the alkyl half esters of citraconic acid, in which the alkyl group contains from 1 to 4 carbon atoms, such as methyl and ethyl acid citroconate, alkyl half esters of chlormaleic acid, in which the alkyl group contains from 1 to 4 carbon atoms, such as methyl and ethyl acid chlormaleate and butyl acid chlormaleate; the alkyl half esters and the like. These esters with the exception of the alkyl acid itaconates are represented generally by the structural formula:

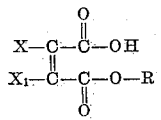

where X is selected from hydrogen, halogen (preferably chlorine) or an alkyl group having at most a number of carbon atoms such that the total number of carbon atoms in the ester does not exceed 9, and where $X_1$ is the same as X, or preferably hydrogen when X is other than hydrogen, and where R is an alkyl group having from 1 to 4 carbon atoms. It is to be understood, of course, that the foregoing structural formula for the esters is intended to include the cis- and trans- forms of the esters falling within the scope of the formula. Of the above described esters, the alkyl half esters of maleic acid, in which the alkyl group contains from 1 to 4 carbon atoms are preferred because such esters yield superior copolymers with vinyl acetate. Of these esters the secondary butyl half ester of maleic acid is especially preferred as a component of the copolymer.

It is to be understood that the copolymers described herein may comprise vinyl acetate and mixtures of the unsaturated acids and esters hereinbefore described, as, for example, copolymers of vinyl acetate, crotonic acid and alkyl half esters of maleic acid, in which the alkyl group contains from 1 to 4 carbon atoms, copolymers of vinyl acetate, crotonic acid and acrylic acid and the like.

The preferred copolymers for use in the mixtures of this invention are those which contain from about 80 to 98 mol per cent of combined vinyl acetate and from about 20 to 2 mol per cent of combined unsaturated organic carboxylic compound, and more preferably those copolymers which contain from about 90 to 98 mol per cent of combined vinyl acetate and from about 10 to 2 mol per cent of combined unsaturated organic carboxylic compound. The present invention is more particularly directed to mixtures comprising particles or beads of the copolymers which have a low or medium molecular weight, that is, a molecular weight such that a molar solution of the copolymer in a solution of 95% ethanol by weight and 5% water by weight has a viscosity of 20 centipoises or less, preferably 7 to 18 centipoises, at 20° C., since particles or beads of such copolymers normally coalesce or cake to an abnormal extent at temperatures between about 70 and 100° F. in the absence of the substantially dry, alkaline alkali metal inorganic compounds of this invention.

The copolymers referred to in the foregoing description may be prepared in various ways. Thus, they may be prepared by emulsion polymerization, that is, by emulsifying the vinyl acetate and the unsaturated organic carboxylic compound in water with an emulsifying agent such as an anionic surface active agent as, for example alkali metal sulfo succinates, alkali metal alkyl benzene sulfonates in which the alkyl group contains 10 or more carbon atoms and the like, and heating the emulsion in the presence of a polymerization catalyst, for example, a persulfate catalyst such as potassium persulfate, a peroxy catalyst such as benzoyl peroxide and the like. After the polymerization is complete the copolymer is separated from the water in well known manner. The copolymers may also be prepared by a bead polymerization procedure which is similar to the emulsion polymerization procedure except that a protective colloid such as polyvinyl alcohol is used to replace a part of the emulsifying agent.

The mixtures of this invention may be prepared in various ways and in various types of apparatus suitable for dry mixing. One procedure which may be used comprises mixing the dry or substantially dry copolymer beads or particles with finely divided particles of the dry or substantially dry alkaline alkali metal compound in a ribbon mixer or in a rotating drum until an intimate mixture of the particles of these materials is obtained. This procedure, however, normally requires a considerable amount of the alkali metal compound in the mixture to prevent caking or coalescing of the copolymer particles at room temperature. It has presently been found that the best procedure for preparing a non-caking mixture with a minimum of the alkali metal compound is to thoroughly mix the ingredients in the dry or substantially dry state until the particles of copolymer which are originally glossy or shiny become dull or lack luster. When such a mixture is formed no appreciable caking or agglomeration of the copolymer particles takes place even though insufficient particles of the alkali metal compound are present to prevent the copolymer particles from touching one another. To obtain such a mixture it is usually necessary to mix the particles of the copolymer and the particles of the alkali metal compound for a period of 0.5 to 4 hours depending primarily on the efficiency of the mixing and the fineness of the particles. There is no upper limit to the time of mixing except the limits imposed by practical considerations such as cost and rate of production of the mixture.

The amount of substantially dry, alkaline alkali metal inorganic compound used in relation to the weight of copolymer particles may be varied considerably depending primarily on the mixing means employed, the duration of the mixing, the particular alkali metal compound and/or copolymer employed, the fineness of the particles and whether it is desired to dissolve or disperse the copolymer in water with stirring without the aid of basic or alkaline substances or dispersing or emulsifying agents. In general, the alkali metal compound is used in an amount sufficient to substantially prevent caking or coalescing of the copolymer particles or beads, as hereinbefore described. If the mixing is carried out to the extent that an intimate mixture is obtained but is discontinued while the copolymer particles still have substantially their original glossiness or shininess large amounts of the alkali metal compound are generally required, that is, from about 20 to 100% by weight of such compound based on the copolymer particles. However, such mixtures will not readily dissolve or disperse in water with stirring except in low concentrations. On the other hand, if the mixing is carried out in the preferred manner, that is, until the copolymer particles or beads become dull or lose their original sheen, considerably smaller amounts of the alkali metal compound, that is, as little as 3% of such compound based on the copolymer particles, may be used. Of course larger amounts of the alkali metal compound may be used. In this type of mixing a preferred range is from about 5 to 15% by weight of the alkali metal compound based on the copolymer particles if a mixture is desired which will dissolve or disperse in water with stirring at useful concentrations without the aid of other substances. For example, if the percentage is appreciably below 5% the copolymer particles usualy will not dissolve or disperse in water per se with stirring. On the other hand, if the percentage of alkali metal compound is appreciably above 15%, the mixture when dissolved or dispersed in water contains more alkali metal compound than is necessary or desirable in some uses, for example, for textile finishing or sizing and is only soluble in low concentrations.

The mixtures described above are substantially non-caking at room or storage temperatures of 70 to 120° F.

If desired, various substantially dry, non-hygroscopic adjuvants may be added to the mixture or mixed with the copolymer particles and the alkali metal compounds. As examples of such adjuvants may be mentioned non-hygroscopic surface active agents such as alkali metal alkyl benzene sulfonates in which the alkyl group contains at least 10 carbon atoms, alkali metal salts of sulfated fatty alcohols containing from 10 to 20 carbon atoms, alkali metal sulfo succinates and the like, in dry form and, preferably, as beads or small particles. Such adjuvants are generally used in small amounts, for example, 1 to 10% of the total mixture. As further examples of adjuvants which may be used may be mentioned substantially dry and non-hygroscopic alkali soluble, film-forming or sizing agents such as casein, zein, polyacrylic acid, alkali metal polyacrylates, polymethacrylic acid, alkali metal polymethacrylates, styrene-maleic acid copolymers, styrene-maleic anhydride copolymers, styrene-alkyl acid maleate copolymers, in which the alkyl group contains from 1 to 4 carbon atoms, and the like. Such adjuvants are used in minor amounts, for example, from about 1 to 50% by weight based on the particles or beads of the copolymer of vinyl acetate and the unsaturated organic carboxylic compound, and are preferably used in the form of beads or small particles.

A further understanding of the compositions and processes of this invention will be obtained from the following specific examples which are intended to illustrate the invention, but not to limit the scope thereof, parts and percentages being by weight unless otherwise specified.

*Example I*

One hundred parts of substantially dry beads of a copolymer containing 97 mol per cent of combined vinyl acetate and 3 mol per cent of combined crotonic acid were mixed with 12 parts of anhydrous, finely divided sodium carbonate particles in a ribbon mixer until an intimate mixture was obtained which required about 1 hour. The copolymer used was prepared by bead polymerization in the presence of benzoyl peroxide catalyst and had a molecular weight such that a molar solution of the copolymer in a mixture of 95% ethanol and 5% water had a viscosity of 11.1 centipoises at 20° C. The beads of this copolymer normally caked or agglomerated on standing for 1 hour at a temperature of 120° F. However, the mixture of the sodium carbonate and the copolymer beads did not cake after standing for at least 3 months at a temperature of 120° F. Moreover, the mixture dissolved readily when added to hot water with stirring. The resulting solution is suitable for coating purposes.

*Example II*

Dry beads of a copolymer containing 97 mol per cent of vinyl acetate and 3 mol per cent of crotonic acid were prepared by bead polymerization of the monomers in the presence of benzoyl peroxide, followed by separation of the beads from the aqueous phase, and vacuum drying at low temperature. The beads at this stage had coalesced to some extent. The dry beads were shiny and were ground until they were free-flowing but caked or agglomerated on standing for 1 hour at a temperature of about 120° F. The copolymer had a molecular weight such that a molar solution of the copolymer, that is, 86 grams of the copolymer in a liter of solution, in a mixture of 95% ethanol and 5% water had a viscosity of 10.2 centipoises at 20° C. One hundred parts of the dry, freshly ground beads of the copolymer were mixed with 8 parts of anhydrous, finely divided sodium carbonate particles in a ribbon mixer until the beads of the copolymer acquired a dull appearance, which required about 3.5 hours. The resulting mixture was substantially non-caking on standing for at least 3 months at a temperature between about 120 and 125° F. The resulting mixture dissolved readily in hot water with stirring and was suitable for textile finishing.

*Example III*

A mixture was prepared as described in Example II, with the exception that 12 parts of anhydrous, finely divided sodium bicarbonate particles were used instead of the 8 parts of sodium carbonate particles. The mixture had substantially the same non-caking properties and hot water-solubility as the mixture of Example II. However, the solutions were superior to the solutions of the preceding examples.

*Example IV*

One hundred parts of dry beads of the copolymer described in Example II were mixed with 12 parts of anhydrous, finely divided sodium borate particles in a rotating container until the originally shiny beads of the copolymer became dull or non-reflective in appearance, which required about 8 hours. The resulting mixture was substantially non-caking for a period of at least 48 hours at a temperature of 120° F. The mixture dissolved in hot water with stirring but the time required was materially longer than the time of dissolution of the mixture of Examples II and III.

*Example V*

Dry beads of a copolymer containing 90 mol per cent of vinyl acetate and 10 mol per cent of the secondary butyl half ester of maleic acid were prepared by bead polymerization of the monomers in the presence of potassium persulfate followed by separation of the beads from the aqueous phase, and vacuum drying at low temperatures. The beads at this stage had coalesced to some extent. The dry beads had a shiny or glossy appearance and were ground until they were free-flowing but caked or agglomerated to a solid, hard mass on standing for 1 to 4 hours at a temperature between about 100 and 120° F. One hundred parts of the dry, free-flowing copolymer beads were mixed with 7 parts of anhydrous, finely divided sodium carbonate in a rotating glass jar until the particles of the copolymer became dull in appearance, which required about 3.5 hours. The resulting mixture did not show any tendency to cake after standing for at least 3 months at a temperature of 120° F. The mixture dissolved readily in hot water with stirring.

The mixtures described herein may be used to prepare solutions of the copolymer in organic solvents which are solvents for the copolymer or to prepare aqueous solutions or dispersions of the copolymer. The organic solvent solutions of the copolymer may be used for coating various substrates such as paper, textiles and the like. The aqueous solutions or dispersions of the copolymers may be used for textile finishing and sizing.

The term "dispersion" as used herein and in the appended claims is intended to mean a true dispersion of particles of the copolymer in water, a colloidal dispersion of the copolymer in water, a colloidal dispersion of the copolymer particles in water in which the particles of the copolymer are in the colloidal size range or true solutions of the copolymer in aqueous solutions of caustic soda, since the copolymer may be present in water under alkaline conditions in any one or more of the above forms. However, in most instances a true solution of the copolymer is obtained in an aqueous caustic soda solution.

Various modifications in the mixtures and processes described herein may be made as will be apparent to those skilled in the art to which this invention appertains without departing from the spirit and intent of this invention. Accordingly, it is not intended to limit or restrict the present invention except by the scope of the appended claims.

What is claimed is:

1. A composition of matter comprising substantially dry particles of a normally coalescent, water-insoluble, alkali dispersible copolymer of from about 90 to 98 mol per cent of vinyl acetate and from about 10 to 2 mol per cent of an ethylenically unsaturated organic carboxylic compound containing from 3 to 9 carbon atoms and having a single carboxyl group and from about 5 to 15% by weight, based on said particles of copolymer, of substantially dry particles of an alkaline alkali metal inorganic compound selected from the group consisting of anhydrous sodium carbonate, sodium bicarbonate, trisodium phosphate, sodium borate and the corresponding potassium, lithium and cesium compounds, the particles of said copolymer being characterized in that they are normally glossy but are dull in appearance in the mixture, and substantially non-caking.

2. A composition of matter according to claim 1, but further characterized in that the copolymer is a copolymer of from about 90 to 98 mol per cent of vinyl acetate and from about 10 to 2 mol per cent of an unsaturated aliphatic monocarboxylic acid copolymerizable with vinyl acetate and having the general formula, $C_nH_{2n-2}O_2$, where $n$ is a whole number from 3 to 6.

3. A process of preparing a substantially non-caking composition which comprises mixing free-flowing particles of a normally coalescent, water-insoluble, alkali dispersible copolymer of from about 90 to 98 mol per cent of vinyl acetate and from about 10 to 2 mol per cent of an ethylenically unsaturated organic carboxylic compound containing from 3 to 9 carbon atoms and having a single carboxyl group with from about 5 to 15% by weight, based on said copolymer, of substantially dry, finely divided particles of an alkaline alkali metal inorganic compound selected from the group consisting of anhydrous sodium carbonate, sodium bicarbonate, trisodium phosphate, sodium borate and the corresponding lithium, potassium and cesium compounds until the particles of the copolymer acquire a dull appearance.

4. A composition of matter according to claim 1, but further characterized in that the copolymer is a copolymer of vinyl acetate and crotonic acid.

5. A composition of matter according to claim 4, but further characterized in that the alkali metal compound is sodium bicarbonate.

6. A composition of matter according to claim 1, but further characterized in that the copolymer is a copolymer of vinyl acetate and an alkyl half ester of maleic acid, in which the alkyl group contains from 1 to 4 carbon atoms.

7. A composition of matter according to claim 6, but further characterized in that the alkali metal inorganic compound is sodium bicarbonate.

8. A composition of matter according to claim 6, but further characterized in that the alkyl half ester is a butyl half ester.

9. A process according to claim 3, but further characterized in that the copolymer is a copolymer of vinyl acetate and crotonic acid.

10. A process according to claim 9, but further characterized in that the alkali metal inorganic compound is sodium bicarbonate.

11. A process according to claim 3, but further characterized in that the copolymer is a copolymer of vinyl acetate and an alkyl half ester of maleic acid, in which the alkyl group contains from 1 to 4 carbon atoms.

12. A process according to claim 11, but further characterized in that the alkali metal compound is sodium bicarbonate.

References Cited in the file of this patent

UNITED STATES PATENTS

| | | |
|---|---|---|
| 2,263,598 | Starck et al. | Nov. 25, 1941 |
| 2,286,062 | Condo et al. | June 9, 1942 |
| 2,458,639 | Quarles | Jan. 11, 1949 |
| 2,607,762 | Bowen | Aug. 19, 1952 |
| 2,621,169 | Robinette et al. | Dec. 9, 1952 |
| 2,630,416 | Piana | Mar. 3, 1953 |
| 2,643,238 | Crozier et al. | June 23, 1953 |

OTHER REFERENCES

Fisch et al.: S. N. 44,224, abstract published in O. G. of Aug. 1, 1950.

Partington: "A Text-Book of Inorganic Chemistry," 6th edition, Macmillan, London (1950), page 689.